Figure 3:
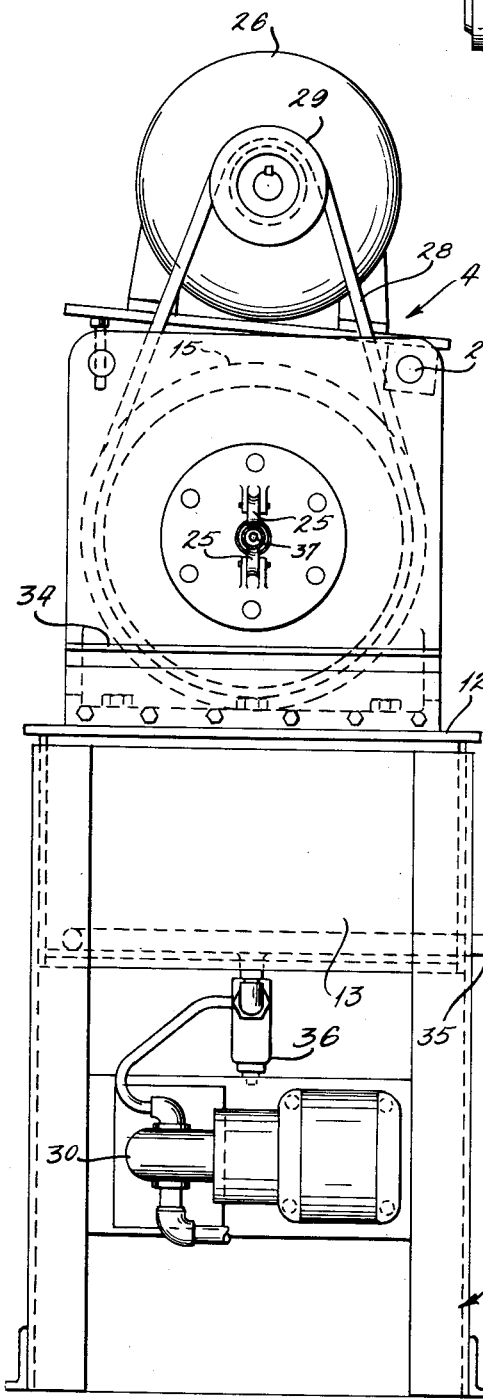

July 5, 1955 W. SIEGERIST 2,712,249
MACHINE FOR FLATTENING INTERNAL BEADS IN WELDED TUBING
Filed March 10, 1950 4 Sheets-Sheet 1
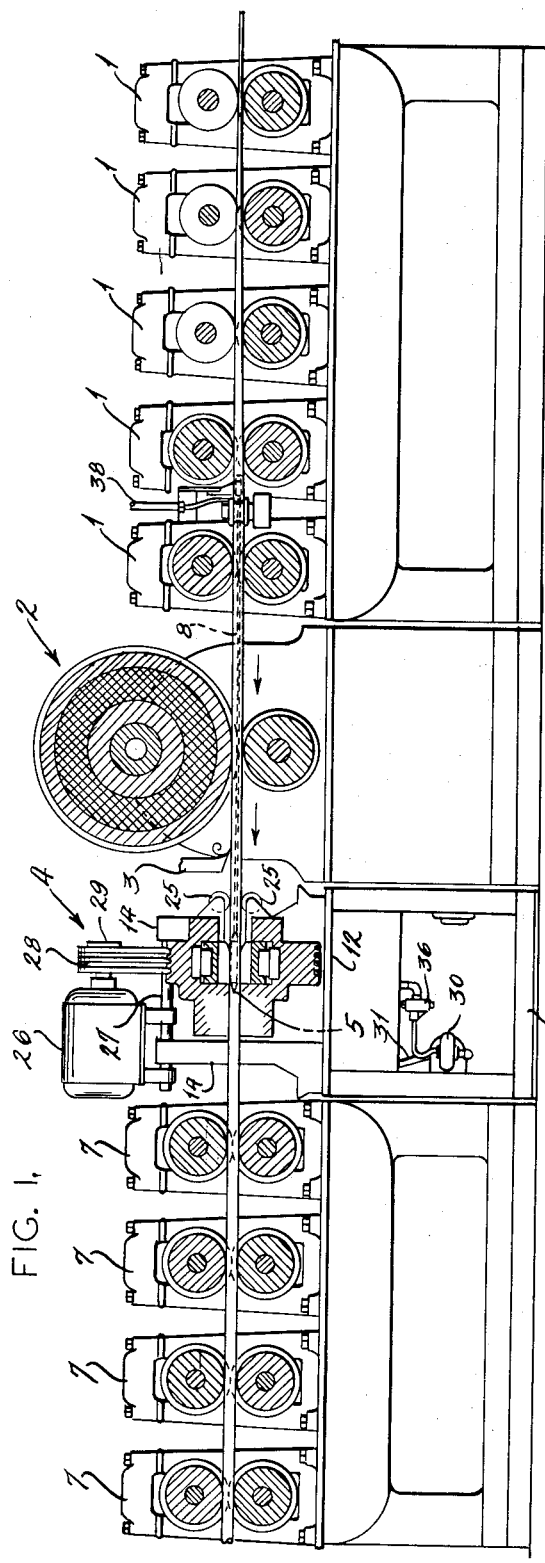
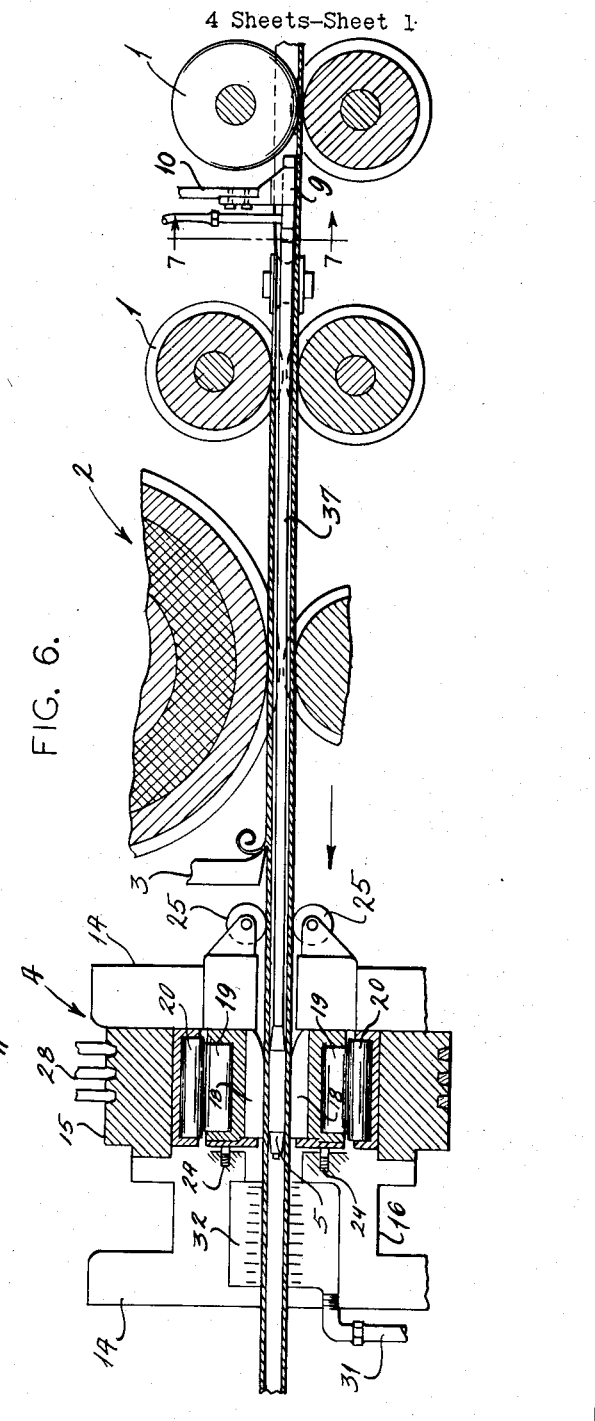
INVENTOR:
Walter Siegerist
By Carr & Carr & Gravely
HIS ATTORNEYS.

July 5, 1955 W. SIEGERIST 2,712,249
MACHINE FOR FLATTENING INTERNAL BEADS IN WELDED TUBING
Filed March 10, 1950 4 Sheets-Sheet 2

INVENTOR:
Walter Siegerist,
By Carr & Carr & Gravely,
HIS ATTORNEYS.

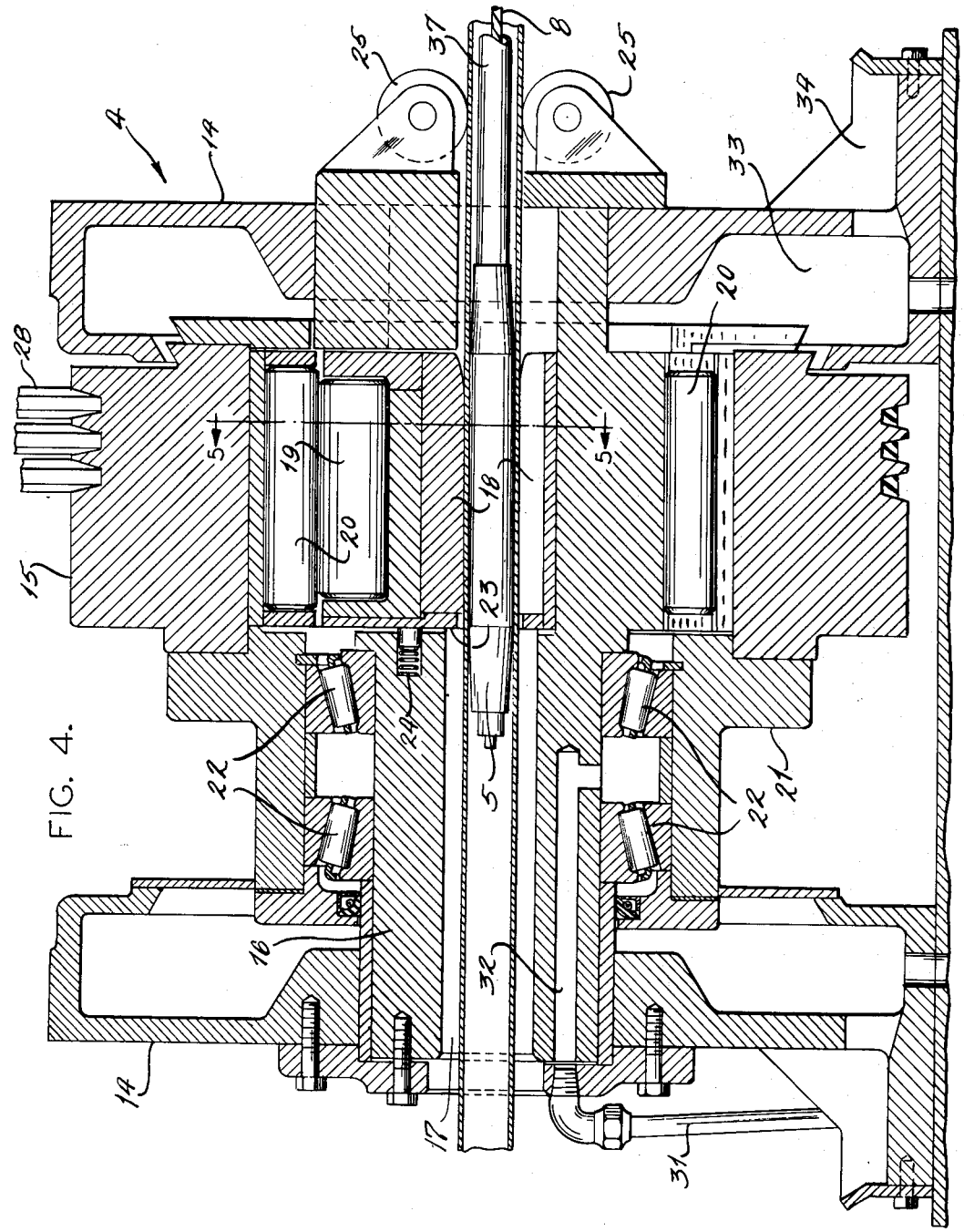

July 5, 1955 W. SIEGERIST 2,712,249
MACHINE FOR FLATTENING INTERNAL BEADS IN WELDED TUBING
Filed March 10, 1950 4 Sheets-Sheet 4
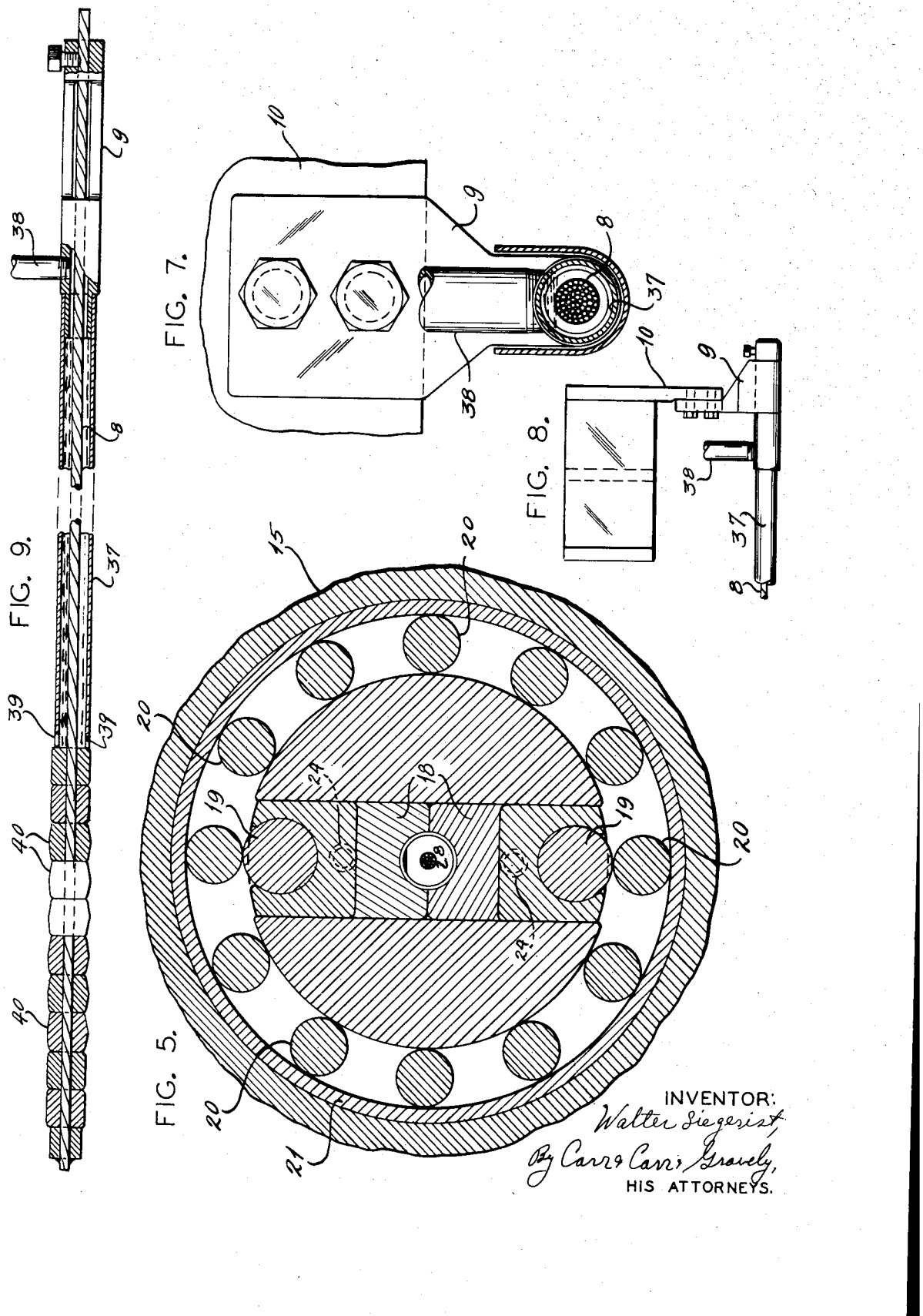
INVENTOR:
Walter Siegerist
By Carr & Carr; Gravely,
HIS ATTORNEYS.

United States Patent Office 2,712,249
Patented July 5, 1955

2,712,249

MACHINE FOR FLATTENING INTERNAL BEADS IN WELDED TUBING

Walter Siegerist, University City, Mo., assignor, by mesne assignments, to Continental Foundry & Machine Company, East Chicago, Ind., a corporation of Delaware Application March 10, 1950, Serial No. 148,883

6 Claims. (Cl. 78—21)

This invention relates to tube welding machines and is more particularly directed to a device for flattening an internal bead formed in a tube during the welding operation.

The primary object of the invention is to provide hammer means employable in connection with a skelp bending and welding machine for flattening the internal bead in the tube formed thereby.

A further object of the invention is to provide mechanism associated with a skep bending and welding machine for obliterating an internal bead in the tube immediately following a welding operation.

Another object of the invention is to provide a device for flattening an internal bead in tubing and in which means are provided for cooling the device as well as the lubricant therefor.

The invention consists in the provision of a skelp bending and welding machine having mechanism associated therewith for flattening the internal flash or bead in tubing, the hammer moving in a single fixed plane and flattening the bead on an anvil which is anchored to the frame of the bending portion of the machine.

The invention also consists in the provision of lubricant circulating means for the flattening device and means for cooling the lubricant.

Figure 2:
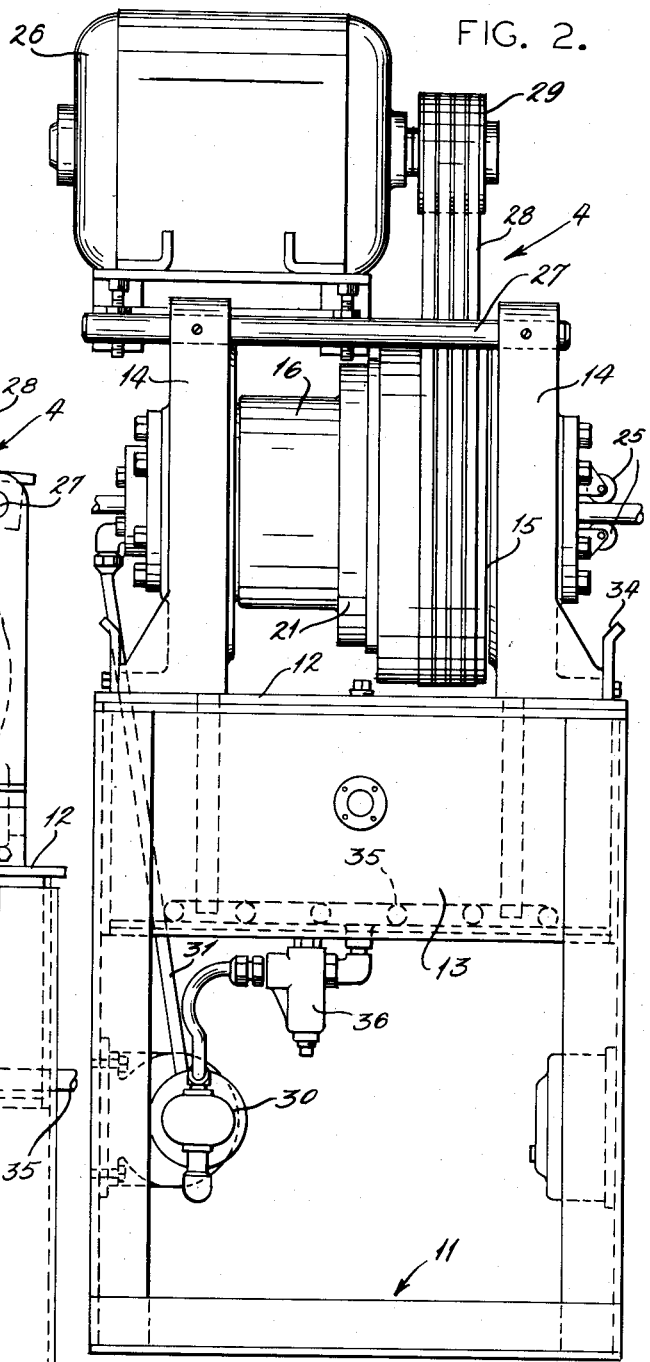

In the drawings:

Fig. 1 is an elevational view, partly in section, of the skelp forming an internal bead removing mechanism, Fig. 2 is a side elevational view of the machine, Fig. 3 is an end elevational view of the flattening machine, Fig. 4 is a sectional view showing the upper portion of the machine, Fig. 5 is a sectional view taken along the line 5—5 of Fig. 4, Fig. 6 is an enlarged schematic view of a portion of the machine shown in Fig. 1, Fig. 7 is a sectional view taken along the line 7—7 of Fig. 6, Fig. 8 is a side elevational view of the anvil cable anchoring means shown in Fig. 7; and Fig. 9 is a longitudinal sectional view of a modified anvil and its cable showing the method of cooling.

The invention is illustrated in the several views of the drawings in which the numeral 1 designates a plurality of roll stands for bending flat strip material or skelp into tubular form for presentation to a welding head 2 disposed at the outlet side of the roll stands. The welding head is preferably electrically operated and welds the edges of the skelp, thereby completing the tube, after which it is presented to a planing tool 3 for removing the external bead. Thereafter the tube is presented to a bead flattening machine 4 in which an anvil 5 is positioned in the same plane as the flattening hammers therein. The machine hammers and anvil flatten the internal bead in the tube, after which a suitable coolant is applied to the tube that is discharged from a nozzle (not shown). The tube is then presented to a series of sizing roll stands 7 for working the tube to the desired internal and external diameter.

The anvil 5 is held in position by means of a cable 8 anchored to a bracket 9 secured to an abutment 10 that may be integral with one of the bending roll stands. If so desired, a rod may be substituted for the cable. The bracket is secured to the stand preceding the one wherein the edges of the skelp are brought together so that the cable 8 can be located substantially on the axis of the tube formed from the skelp, thereby enabling the tube making process to be continuous. The natural resilience of the cable is employed for holding the anvil in line with the hammers and for permitting limited axial movement of the anvil with respect to the machine and tube. As the tube passes through the machine, the internal bead is hammered flat, thus causing the tube to have a smooth bore, thereby making it suitable for use as a conduit for an electric cable.

The flattening machine is more particularly illustrated in Figs. 2, 3, 4 and 5 and comprises essentially a base 11 fabricated from suitable angle bars. A plate 12 is disposed above the base and forms a cover for the lubricant receptacle 13 located in the upper part of the base. A pair of supports 14 is secured to the plate 12 between which the hammer actuating pulley 15 is rotatably supported. Secured to the supports 14 is a cage 16 provided with a bore 17 for receiving the tube after it passes the welding head 2. The anvil 5 is located in the bore of cage 16 and hammers 18 are reciprocably mounted in the cage, there being suitable slots therein for receiving the hammers. Each of the hammers has a roller 19 rotatably supported therein and engageable with one of the series of rollers 20 rotatably supported in the pulley 15. This pulley is applied to a sleeve 21 and a series of antifriction bearings 22 are disposed between the cage 16 and the sleeve so that the pulley may rotate freely. The rollers 20 successively engage rollers 19, causing the hammers 18 to be applied to the tube opposite the anvil 5, during which action the internal bead in the tube is hammered flat, resulting in a smooth bore therefor.

The machine is provided with a plate 23 acting against a spring 24 located in a socket in cage 16. The function of this plate and spring is to permit a certain amount of lateral movement of the hammer during the period of time it is in actual engagement with the moving tube, the tube being continuously movable through the forging machine. During this lateral movement the anvil 5 moves along with the tube, this being permitted by reason of the resilience of cable 8. As soon as the hammers 18 are released from the tube, spring 24 returns them to the position indicated in Fig. 4. A pair of adjustably mounted bronze guide rollers 25 for accommodating various diametered tubing, is provided on cage 16 for the purpose of centering and assisting the entrance of the tube into the machine. These guide rollers ground any stray currents in the tube derived from the welding head, thereby preventing pitting or otherwise marring the tube. A drive motor 26 is adjustably mounted on slides 27 secured to supports 14. A series of V belts 28 is connected between pulley 29 on the motor 26 and the pulley 15, thereby providing motor power for the machine.

The machine is cooled by means of the lubricant in receptacle 13 that is circulated through the machine by a pump 30. The pump discharges through a conduit 31, then passes into a duct 32 and through the antifriction bearings 22, and then over the rollers 20 on pulley 15, rollers 19 on hammers 18, after which it enters a cavity 33 formed in one of the supports 14 and is then returned to receptacle 13. A trough 34 surrounds the machine and collects any lubricant that gathers on the external surface of the machine for return to receptacle 13. Considerable heat is generated in the machine and a cooling coil 35 is located in the receptacle through which water or other cooling fluid may pass for withdrawing heat from the lubricant in the receptacle, said lubricant being continuously circulated. A strainer 36 is provided in the inlet side of the pump for removing any foreign matter that might be in the lubricant.

The anvil 5 and cable 8 to which it is secured, collects a great deal of heat from the bead flattening operation and in order to carry a substantial portion of this heat away, the anvil cable is placed within a tube 37 extending from the bracket 9 into the machine to a point adjacent to the anvil 5. The lubricant in the receptacle 13 can also be pumped into the tube 37, although a separate system may be preferred, thus withdrawing a considerable portion of the heat that collects in the anvil 5. Lubricant enters through pipe 38, passes through tube 37 and discharges through ports 39, there being suitable arrangements made for collecting the discharged lubricant and return it to a receptacle. The right hand end of tube 37 is sealed escape of lubricant. The anvil is preferably a smooth tapered body that permits the tube to freely pass thereover and, since the lubricant is applied to the anvil, the relative movement between the tube and the anvil will be continuous because the tendency of the anvil to expand by reason of heat, is eliminated.

Fig. 9 shows the anvil made up of a plurality of cylindrical segments 40 suitably anchored to the cable 8. The purpose of these cylindrical segments is to present a plurality of individual surfaces on which the work hammers are effective.

Some of the lubricant pumped into the machine floods the lower rollers 20 as well as the lower portion of the bearings 22, thereby assuring adequate cooling and lubricating of the machine.

What I claim is:

1. A machine for flattening the internal bead in a tube continuously passing therethrough in one direction comprising a mandrel held in said machine and positioned within the tube, a hammer movable toward and away from the longitudinal axis of the tube and mandrel, said hammer being movable in a fixed single plane, an annular means surrounding said tube and mandrel including a plurality of spaced roller means for periodically engaging and actuating said hammer toward the tube to flatten the internal bead, pulley means circumscribing said annular means for rotating same to thereby actuate the hammer for flattening the internal bead in the tube as it is continuously passed over said mandrel through said forging hammer actuating means, resilient means for allowing said hammer to move periodically with said tube for short distances during bead flattening actuation, and means for cooling and lubricating said hammer actuating means.

2. A machine for flattening the internal bead in a tube continuously passing therethrough in one direction comprising a mandrel held in said machine and positioned within the tube, a plurality of hammers, means mounting said hammers for movement in a fixed plane toward and away from the tube and mandrel, pulley means circumscribing said hammers and constructed to rotate freely upon said mounting means, roller means in said pulley means to periodically engage said hammers and actuate the latter toward the tube and mandrel, means for rotating said pulley means for actuating said hammers for flattening the internal bead in the tube as it continuously passes over said mandrel in one direction through said hammer actuating means, resilient means restraining said hammers for limited movement by the tube during bead flattening actuation, means for forcing lubricant into said hammer actuating means; and means for cooling said lubricant for said hammer actuating means.

3. A machine for flattening the internal bead in a tube continuously passing therethrough comprising an anvil held in the machine and arranged within the tube, a plurality of hammers each mounted for movement in a single fixed plane radially toward and away from the anvil and the tube, means circumscribing said hammers and including circumferentially spaced roller means periodically engaging and actuating said hammers, means for rotating said last mentioned means to thereby cause said hammers to be moved periodically radially toward and away from the anvil as the tube passes continuously thereover for flattening the internal bead, yieldable means supporting said hammers so that they may move for a limited distance in the direction of movement of the tube, said yieldable means acting on said hammers for reversely moving said hammers, and means for forcing lubricant into said hammer actuating means.

4. A machine for flattening the internal bead in a tube continuously passing therethrough comprising a mandrel held in said machine and arranged within said tube, a plurality of hammers, cage means mounting said hammers about the tube for movement in a fixed plane toward and away from the tube and mandrel, a plurality of spaced roller means circumscribing said hammers and constructed and arranged to move them in a fixed plane radially toward and away from the tube and mandrel, pulley means rotatably carried by said cage means and supporting said roller means for actuating said hammers periodically for flattening the internal bead in the tube as it continuously passes over said mandrel in one direction through said forging hammer actuating means, and yieldable means mounting said hammers for limited movement by the tube in the direction of tube movement during the periods of bead flattening actuation of said hammers.

5. A machine for flattening the internal bead in a tube continuously passing therethrough in one direction comprising a mandrel held in said machine and arranged within the tube, a hammer movable in a radial direction toward and away from the longitudinal axis of the tube and mandrel, said hammer being movable in a fixed single plane, an annular means surrounding said tube and mandrel including a plurality of spaced roller means periodically engaging and actuating said hammer, means circumscribing said annular means for rotating same to thereby actuate the hammer for flattening the internal bead in the tube as it is continuously passed over said mandrel through said hammer actuating means, and yieldable means for allowing said hammer to move axially with said tube for short distances during periods of hammer actuation radially toward the tube.

6. In a machine operating continuously to form welded seam tubing from skelp and remove the external bead after welding: the improvement of internal bead flattening means including a cage assembly having a sleeve and a through bore for the formed tubing; an anvil positioned in the through bore within the formed tubing; means fixing the anvil position and extending along the formed tubing to a point of connection with the machine adjacent the skelp; a pulley rotatably carried by said cage and surrounding the position of said anvil within the formed tubing; hammer means in said sleeve embracing the tube about said anvil; a plurality of circumferentially spaced roller elements carried within said pulley in position to engage said hammer means and displace said hammer means periodically radially inwardly to flatten the internal bead in the tubing against said anvil, said hammer means being free to move axially a limited distance relative to said sleeve in the direction of tubing movement through said cage during inward radial displacement thereof by said roller elements; and resiliently displaceable means adjacent said hammer means to move the latter reversely to the direction of tubing movement during the intervals when said roller elements are out of engagement with said hammer means.

(References on following page)

References Cited in the file of this patent

UNITED STATES PATENTS

| | | | |
|---|---|---|---|
| 10,013 | Potts | Sept. 13, | 1853 |
| 150,374 | Tasker | Apr. 28, | 1874 |
| 180,169 | Tasker | July 25, | 1876 |
| 376,144 | Dayton | Jan. 10, | 1888 |
| 391,825 | Taylor | Oct. 30, | 1888 |
| 443,030 | Wood | Dec. 16, | 1890 |
| 579,214 | Adams | Mar. 23, | 1897 |
| 1,481,630 | Sussman | Jan. 22, | 1924 |
| 2,007,996 | Baker | July 16, | 1935 |
| 2,036,673 | Anderson | Apr. 7, | 1936 |
| 2,126,923 | Romanelli | Aug. 16, | 1938 |
| 2,460,490 | Cook | Feb. 1, | 1949 |

FOREIGN PATENTS

| | | | |
|---|---|---|---|
| 837,391 | France | Feb. 8, | 1939 |